Aug. 9, 1927.
W. O'BRIEN
GROOVED WHEEL
Filed Oct. 4, 1924
1,638,702
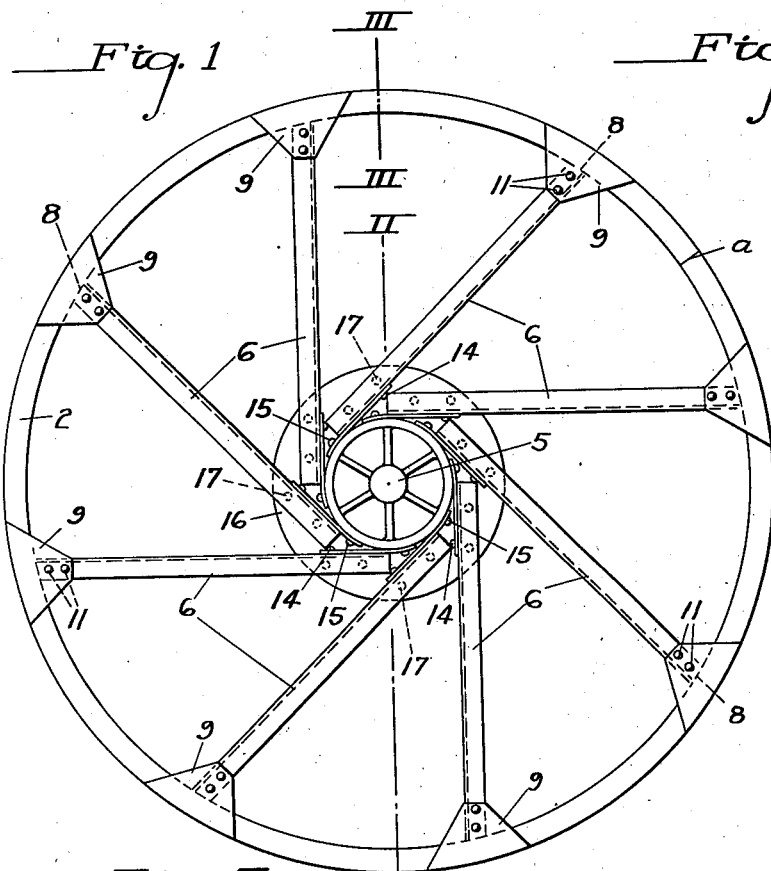
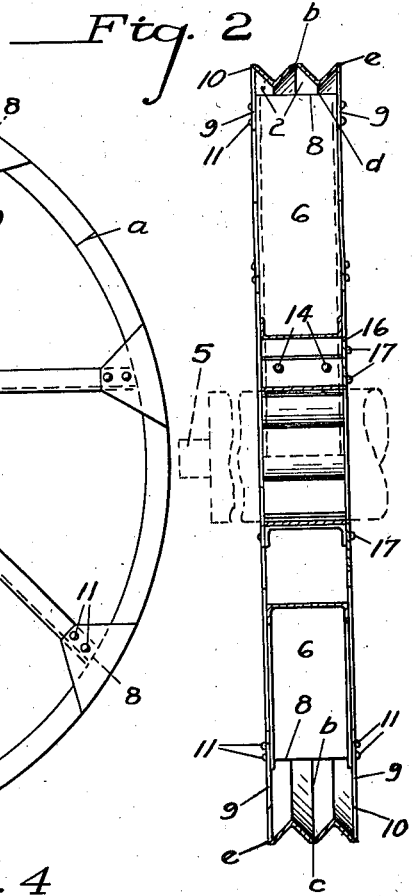
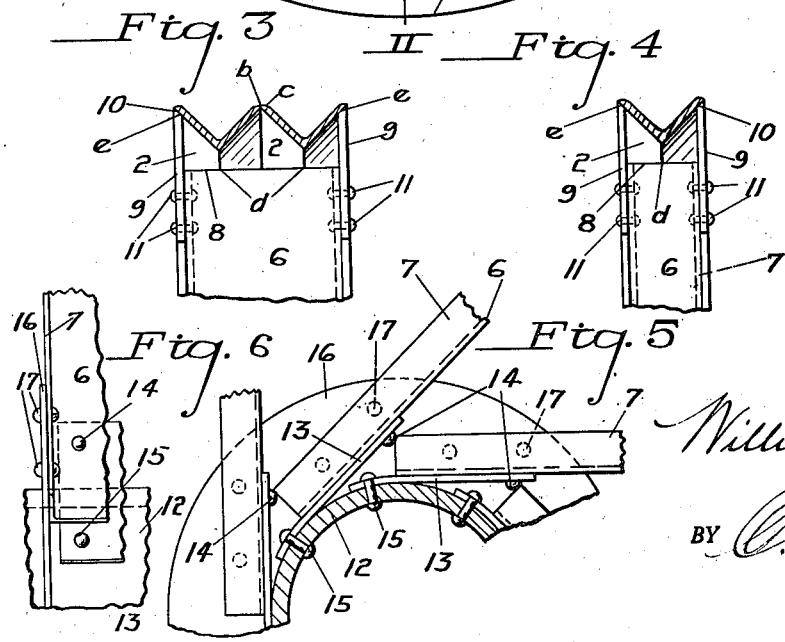
William O'Brien
INVENTOR.
BY O. M. Clarke
ATTORNEY.

Patented Aug. 9, 1927.

1,638,702

UNITED STATES PATENT OFFICE.

WILLIAM O'BRIEN, OF WASHINGTON, PENNSYLVANIA.

GROOVED WHEEL.

Application filed October 4, 1924. Serial No. 741,572.

My invention relates to improvements in grooved wheels adapted to use with cables, ropes etc., of the kind generally known as sheave wheels.

It has for its object to provide a wheel of this type made of structural shapes, as to its rim portion, for the purpose of securing the advantages of a continuous annular finished groove of uniform size and finish, with the necessary strength, lightness, and economy, in a simple and efficient manner. Also, to provide an efficient, strong, and practicable spoke and hub construction, with other features of improvement and novelty, as hereinafter described.

The improvement is adapted to the manufacture of such a wheel in any desired size, of single or plural grooves, for use in any desired manner, and especially as a bull wheel or tug wheel for oil well rigging.

Ordinarily, such wheels have been made with wooden peripheries, involving considerable waste, accurate and expensive lathe work, and skilled wheelwright experience. It has also been proposed to form the groove or grooves of such wheels of shaped plate or cast metal construction, of various special forms, involving specially constructed supporting members.

In my invention, I utilize standard rolled structural shapes, permitting the use of ordinary shop tools, a minimum of material, and practically no scrap, and having the advantages hereinafter described.

Certain preferred embodiments of the invention are shown in the accompanying drawings, in which:

Fig. 1 is a view or my improved wheel in side elevation;

Fig. 2 is a vertical section on the line II—II of Fig. 1;

Fig. 3 is an enlarged section on the line III—III of Fig. 1;

Fig. 4 is a similar view, showing a single groove construction;

Fig. 5 is a sectional detail view, showing the manner of connecting the hub and spokes;

Fig. 6 is a detail view, showing the hub construction and spoke construction.

In forming the annular sheave portion of the wheel, I use a structural angle rolled shape member 2 which is cut to proper length and formed into a circle of the desired diameter. The abutting ends are electrically welded as at $a$, to provide the sheave ring. When a plurality of grooves are desired, as two, for a double sheave wheel, two such angle rings are laid side by side and the abutting edges of the inner angle legs are continuously welded by electric welding, as at $b$. In such welding, the metal is flowed together, forming a strong joint, after which the double groove ring is rotated, and any rough edges or uneven surfaces are ground off, as at $c$.

For the purpose of supporting the groove ring or rings around the cylindrical hub 5, I utilize a series of spokes 6 preferably of channel form. Such spokes are of a width slightly less than the outside width of the angle groove member or members 2 and with their flanges 7 facing outwardly, parallel with and inwardly of the outer edges of the angle members.

The outer ends 8 of the spokes extend across and support the inner angular middle edge of each angle member, providing solid bearing supports at intervals around the wheel. At each such location, the channel shape spoke is secured to the angle rim or rims 2 by two triangular shaped gusset plates 9, the outer wider portion of which is chamfered as at 10, and is electrically welded to the under edge portion of the angle at each side. The inner tapering portion of plate 9 is bolted or riveted to the flange 7 of the channel spoke, as at 11, providing a solid substantial joint connection at each side of the wheel. In this manner, the single or plural groove rim is fixedly connected with the ends of the several spokes at comparatively close intervals and is stiffly maintained in a truly circular condition at all times.

The hub of the wheel consists of cylindrical hollow barrel or tube 12, which may be of wrought or cast metal, as preferred. In the application of the invention to the drilling art, the grooved wheel is mounted on one end of such barrel, and the usual bull wheel on the other, as is commonly practiced, with suitable journal bearings at each end.

The several spokes 6 extend in from the rim at a tangent to hub 12, and are connected by a strap 13 riveted or bolted at one end to the web of each spoke 6, as at 14, and at the other end to the wall of the hub, as at 15. The straps 13 are preferably of the full width of the channel spoke member, providing ample bolting or riveting area. A reinforcing ring plate 16 surrounds the hub at one side of the several spokes 7, and is secured to one flange thereof by bolts or rivets 17. By so connecting the inner ends of the several spokes to the hub and to each other, the wheel structure is very strongly reinforced and braced, and with especial reference to the work in view.

Inasmuch as the wheel as a whole is intended for use in the manner of a pulley to impart rotation and power to the hub and its bull wheel, the pull of the cable on the rim is transmitted to the hub through the tangentially arranged spokes to an advantage, in that the pull is exerted against the periphery of the hub 12 through the straps 13.

It will be understood that in assembling the wheel the angle member or members are fitted or sprung into position around the outer ends of the spokes, and the abutting ends are then welded together. The inner angular edge of each angle groove member may then be welded to the end of each spoke, as at $d$, and the under outer edge portions of the angle groove members are welded to the beveled terminals of the plates 9, as at $e$. Wherever any outer roughness or projections result from the welding operation, it is ground off smooth by a suitable tool, upon rotation of the wheel.

The advantages of the invention will be readily understood and appreciated by all those familiar with the use of grooved wheels.

The use of structural shapes, as channels and angles, of already finished surfaces, is well adapted to the construction of a wheel of the kind involved, while ensuring continued service and efficiency.

In commercial rolled angles, the inner faces of each side are joined by a rounded filet, providing the desirable rounded bottom for a cable. The edges of each leg of the angle are also rounded, providing original rounded terminals, while the taper of the legs ensures the best and most economical distribution of the metal with resulting desired strength.

Any suitable or desired number of grooves may be secured by varying the number of angle members, with proper width of channel members, while the wheel as a whole may be changed or varied in detail construction by the skilled mechanic without departure from the scope of the following claims.

What I claim is:

1. A grooved wheel comprising an annular peripheral groove member of structural angle shape bent to circular form and welded together, said wheel having an initially concaved outer bottom portion and outwardly rounded terminals, a central hub, and flanged spokes extending therefrom having parallel side plates secured thereto and provided with beveled terminals engaging underneath the rounded edge portions of the groove member and welded thereto.

2. The combination with a hub member and a series of outwardly extending flanged spokes connected therewith, of a plurality of peripheral groove members of structural angle shape having their edges welded together providing a rounded annular ridge, and outer parallel side plates secured to the end flanged portions of the spokes and engaging underneath the outer rounded edge portions of the groove members and welded thereto.

In testimony whereof I hereunto affix my signature.

WILLIAM O'BRIEN.